Jan. 17, 1950 H. F. SHUMANN 2,494,905
METHOD AND APPARATUS FOR HEAT SEALING
Filed Sept. 11, 1946 2 Sheets-Sheet 1

Inventor
HAROLD F. SHUMANN,
By Ross C. Surrey
Attorney

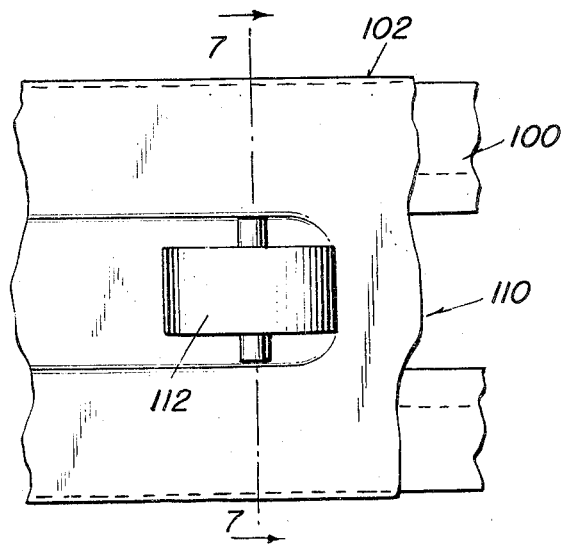
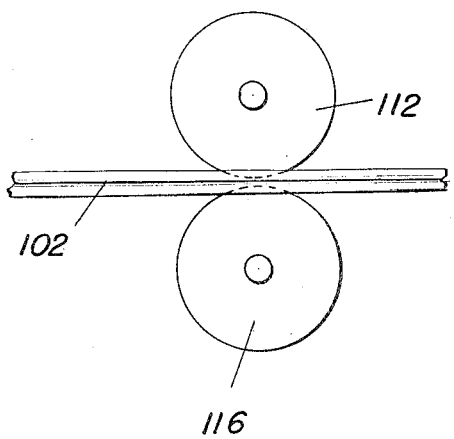
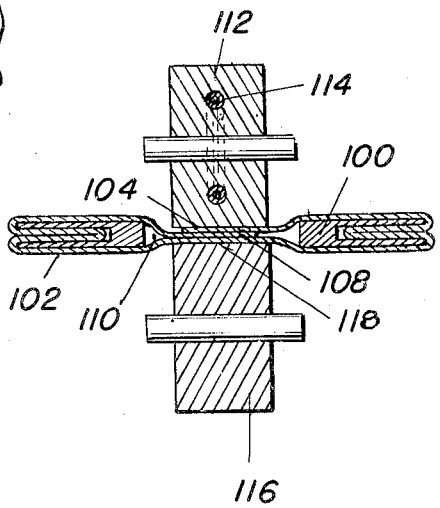

Patented Jan. 17, 1950

2,494,905

UNITED STATES PATENT OFFICE 2,494,905

METHOD AND APPARATUS FOR HEAT SEALING

Harold F. Shumann, Pittsburgh, Pa.

Application September 11, 1946, Serial No. 696,191

6 Claims. (Cl. 93—35)

It is an object of this invention to provide an improved method and apparatus for heat sealing a plurality of superimposed plies of sheet material which plies individually are heat sealable on both surfaces.

It is a further object of this invention to provide a method and apparatus as aforesaid by which a plurality of more than two superimposed plies may be subjected to heat and pressure simultaneously with selected plies or portions thereof being prevented from sealing.

The above and other objects will be made clear in the following detailed description taken in connection with the annexed drawings in which:

Fig. 5 is a plan view showing an application of this invention to tubing operations;

Fig. 6 is a side elevation corresponding to Fig. 5; and

Fig. 7 is a section on the line 7—7 of Fig. 5.

In the manufacture of bags and in the closing of filled bags formed of sheet material which is heat sealable on both sides it has heretofore been considered impossible to avoid the sealing to each other of all plies within the area to which the heat and pressure is applied without the interposition with some form of shielding member between opposed surfaces at the particular location where sealing is not desired. The present invention eliminates the necessity of shielding and, therefore, enormously simplifies and expedites the sealing operation. The basis of the instant invention lies in the fact that if a web is pressed between a hot member and a relatively cold member the relatively cold member can be made to conduct heat out of the sheet at a rate sufficient to prevent an undesirable rise in the temperature of the sheet despite contact with the hot member. This conduction of heat by the cold member is not merely a function of its temperature but is even more a function of the material of which it is made or of which, at least, its active surface is made.

One type of bag machine shown generally in U. S. Patent No. 2,330,446 forms sheet material into a tube around a mandrel. The end of the tube projects somewhat beyond the end of the mandrel. This free end is folded back around the edge of the mandrel and into contact with the body of the tube. The folded end is then subjected to the pressure of a hot pressure bar by means of which the inner contacting surfaces of the folded tube end are sealed to each other and the fin thus formed is sealed to the body of the bag. After this sealing step the bag is withdrawn from the mandrel. The mandrel prevents sealing of the contacting inner surfaces of the bag within the area to which heat and pressure are applied. In U. S. Patent No. 2,339,304 there is disclosed a bag of this type in which, while the folded end is sealed to form a fin, the central portion of the folded end is shielded to avoid sealing of the fin to the body of the bag in this particular area. To produce this bag heretofore has required interposition of a sealing member.

Figure 1:
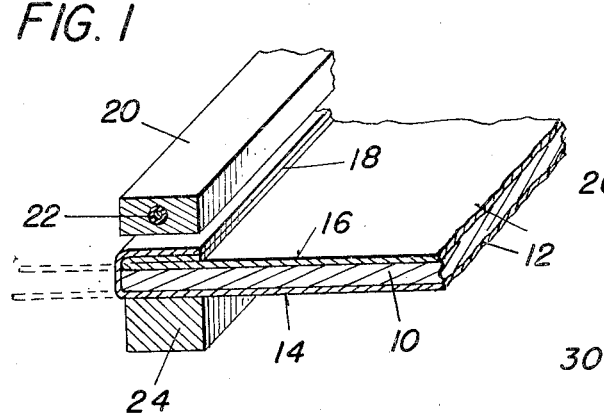
Fig. 1 is a perspective view partly in section showing one application of this invention.

Referring now to Fig. 1 there is shown a mandrel 10 having a web 12 wrapped around it to form a tube. This tube has a front wall 14 and a rear wall 16. These walls are folded together to form a fin 18. A pressure bar 20 having heating means 22 then descends upon the folded fin 18. The mandrel 10 is supported against the pressure of the bar 20 by a supporting bar 24 which normally is slightly out of contact with the front wall 14.

In practice heretofore the mandrel 10 in the area contacted by the bar 20 has been surfaced with felt having a conductivity constant (B. t. u. per square foot per degree Fahrenheit per hour per foot of thickness) of 0.022. This was and is good logical engineering since the greater the insulating value of the mandrel the greater will be the effectiveness, in a given time, of the hot bar 20. If, however, it is desired to prevent the sealing of the fin 18 to the rear wall 16 in a particular area then the conductivity of the mandrel surface within such area must be increased and if it is increased to the right point sealing of the fin 18 to the wall 16 will be prevented while mutual sealing of the walls 14 and 16 forming the fin 18 will occur.

For most heat sealable sheet materials where the effect just described is desired, a sufficient increase of conductivity can be obtained by impregnating the felt surface of the mandrel with a suitable plastic and thereby increasing the thermal conductivity of the mandrel surface. For example: cellulose acetate of the formulation sold under the trade name "Plastacele" has a conductivity constant running between 1.57 and 1.89. The methyl methacrylate resin sold under the trade name "Lucite" has a conductivity constant running between 1.167 and 1.748. Obviously the entire field of resins is available and these may be selected to meet the requirements of any particular sheet.

Figure 2:
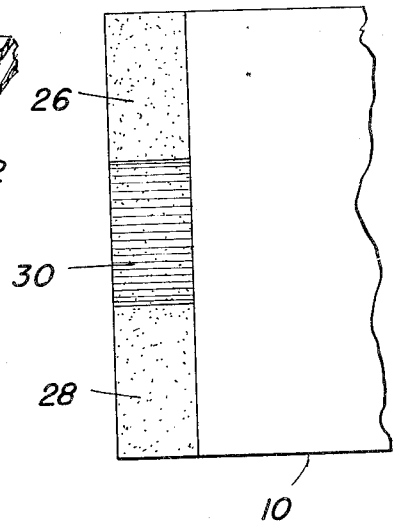
Fig. 2 is a plan view of the mandrel shown in Fig. 1.

Fig. 2 shows the mandrel 10 having felt at its outer edges 26 and 28 while the same felt at the center 30 is suitably impregnated.

In closing filled bags by heat sealing the most usual practice is to collapse the bag mouth, fold it upon itself and subject the folded end to heat and pressure between a pair of heated jaws. The reason for folding the end is to secure adequate strength. Without the fold, a seal formed across the bag mouth by heat and pressure would be subject to peeling, that is, forces tending to separate the sealed walls would be resisted only on a geometric line and not by the whole area of the seal. Such fin type seals are notoriously weak. The conventional method, however, in effect produces an internal fin which itself is subject to peeling. Where the package is intended to be moisture vapor proof any such peeling at the mouth of the bag reduces the resistance to moisture vapor penetration.

Figure 3:
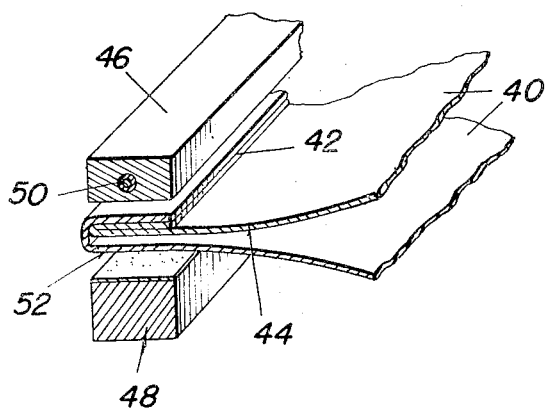
Fig. 3 is a perspective view partly in section illustrating another application of this invention.
Figure 4:
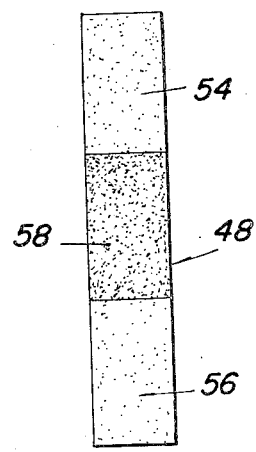
Fig. 4 is a plan view of the lower jaw shown in Fig. 3.

Fig. 3 shows the mouth of a filled bag 40. Its end 42 has been collapsed to form a fin which fin has been folded back against the front wall 44 of the bag. The fin 42 and the adjacent bag body are pressed between a hot bar 46 and a cold bar 48. The hot bar 46 carries a heating element 50. Here it is desired that the two walls comprising the fin 42 be sealed to each other; that the fin 42 be sealed to the wall 44 except at the center and that the inner surface of the wall 44 be not sealed to the rear wall 52 in the area between the bars 46 and 48. This is accomplished by surfacing the bar 46 at its ends 54 and 56 with material which is only reasonably conductive, such as, lead (conductivity constant 19.8) steel (conductivity constant 25.9) or brass (conductivity constant 63). At the center 58 the surface of the bar 46 is formed of highly conductive material, such as, aluminum (conductivity constant 119) or copper (conductivity constant 220). To meet this situation, where the heat to be diffused, must penetrate the wall 44 and the wall 52 the relatively low conductivity resins usually will not be sufficient and, therefore, resort is had to the metals.

The problem of heat sealing the longitudinal seam in ordinary bag making operations, where the web moves continuously and is heat sealable on both sides, is one which in practice has remained insoluble despite a multitude of efforts in the last twenty years. The instant invention meets this problem perfectly. In Figs. 5, 6 and 7 there is illustrated a conventional tuber 100 surrounded by a tube 102 having one margin 104 overlapping the opposite margin 108 to form a longitudinal seam.

The former plate 100 has an opening 110 formed therein. Above the opening is a press roll 112 containing a heating element 114. Below the former plate is a pressure roll 116 which is not heated and which, when necessary, may be positively refrigerated. These rolls through the opening 110 press upon the margins 104 and 108 and also upon the front wall 118 of the tube 102. The roll 116 is formed of a suitable metal the choice being dictated by the nature of the material from which the tube 102 is formed. If, for example, the tube is formed of rubber hydrochloride the roll 116 should be made of copper or aluminum. If, however, the tube 102 is formed from or surfaced with one of the vinyl polymers then lead, steel or brass would be indicated. In using an arrangement of the sort shown in Figs. 5, 6 and 7 it will usually be desirable to provide some sort of radiant pre-heater operating in advance of the roll 112 since contact of the material with the roll 112 is only momentary. The use of such pre-heating obviously affects the choice of material for the roll 116, since with pre-heating the necessary temperature of the roll 112 may be lowered.

Hundreds of applications of the above described methods and machines will suggest themselves to those skilled in the art and the principles herein discussed are applicable to a multitude of machine structures. It is not, therefore, intended to limit this disclosure to the precise details herein set forth but only as expressed in the subjoined claims which are to be broadly construed.

I claim:

1. In a bag machine of the type wherein a tube of flexible, heat sealable material is formed around a mandrel, the tube end is folded back over the end of the mandrel and a pressure bar having its active surface uniformly heated is pressed against the folded end and resisted by the mandrel, the improvement comprising having on such mandrel predetermined areas of that portion of its surface opposed to the pressure bar of materials having mutually different, predetermined thermal conductivities the material having the higher conductivity serving to withdraw heat from the tube body at a rate sufficiently high to maintain the interface between the tube body and the folded tube end at a temperature below that required to seal together the plies in contact at said interface.

2. The method of selectively heat sealing to one another less than all of a plurality of superimposed plies of flexible, readily heat sealable material, comprising applying sufficient heat to the exposed surface of an outer one of said plies to seal said outer ply to the adjacent inner ply, and withdrawing heat from the exposed surface of the other outer ply at a rate sufficiently high to maintain the interface between the latter ply and the next innermost ply at a temperature below that required to seal together the last named plies.

3. The method of selectively heat sealing to one another less than all of a plurality of superimposed plies of flexible material capable of being heat sealed readily to one another under heat and pressure, comprising applying sufficient heat to the exposed surface of an outer one of said plies to seal said outer ply to the adjacent inner ply, withdrawing heat from the exposed surface of the opposite outer ply at a rate sufficient to maintain the interface between the latter ply and the next innermost ply at a temperature below that required to seal together the last named plies, and pressing all of said plies into pressure contact with one another.

4. Apparatus for selectively heat sealing a plurality of more than two superimposed webs comprising: a pressure member and means for heating to substantially a uniform temperature the entire area of its active face; a second pressure member having an active surface registering with and opposing the active surface of said first pressure member, said second pressure member being unheated, the active surface of said second pressure member having portions of its area in registry with the active surface of said first pressure member formed of mutuallly different materials having mutually different thermal conductivities the area having higher conductivity serving to withdraw heat from the ply with which it is in contact at a rate sufficiently high to maintain the interface between said ply and the next ply at a temperature below that required to seal together said plies.

5. A method of tubing a web of heat sealable, flexible material comprising: continuously drawing a web around a former plate to form a tube having front and rear walls with the web margins overlapped in one of said walls to form a seam; passing said seam and the adjacent wall through a rolling contact, source of pressure; during said pressure application, adding heat to the outer ply of said seam and withdrawing heat from the outside of the opposite wall of said tube at a rate sufficient to maintain the interface between said wall and the inner ply of said seam at a temperature below that required to seal together said wall and said inner ply.

6. A tuber to form a tube from a continuous web of flexible heat sealable material, said tuber comprising: a former plate around which a web is drawn to form a tube having front and rear walls with the web margins overlapped in one of said walls to form a seam, said former plate having an opening therethrough in alignment with said seam; a pair of rollers on opposite sides of said former plate and engaging a wall and the seam of said tube to press the same together; means for heating the roller in contact with said seam, the opposite roller, in contact with said wall, being unheated and being surfaced, at least, with a material having a predetermined thermal conductivity, said thermal conductivity being such as to withdraw heat from the outside of the tube wall in contact therewith at a rate sufficient to maintain the interface between said tube wall and the adjacent inner ply of said seam below that required to seal together said wall and said inner ply.

HAROLD F. SHUMANN.

REFERENCES CITED

The following references are of record in the file of this patent:

UNITED STATES PATENTS

| Number | Name | Date |
|---|---|---|
| 515,121 | Hunt | Feb. 20, 1894 |
| 2,125,306 | Novick | Aug. 2, 1938 |
| 2,125,758 | Waters | Aug. 2, 1938 |
| 2,249,392 | Moore | July 15, 1941 |
| 2,253,946 | Waters | Aug. 26, 1941 |
| 2,289,618 | Young | July 14, 1942 |
| 2,348,196 | Duhaime | May 9, 1944 |